Feb. 12, 1963 R. P. DUMM 3,077,201
SEAL SEAT CONSTRUCTION FOR A BALL VALVE
Filed June 26, 1961

INVENTOR.
ROBERT P. DUMM,
BY
ATTORNEY 3,077,201
SEAL SEAT CONSTRUCTION FOR A BALL VALVE
Robert P. Dumm, Long Beach, Calif., assignor to Pacific Valves, Inc., Long Beach, Calif., a corporation of California
Filed June 26, 1961, Ser. No. 119,388
2 Claims. (Cl. 137—315)

This invention relates to a seal seat construction, particularly for a ball valve, and one object of my invention is to prevent internal line pressure within the valve from getting behind the plastic seat and extruding or forcing that seat or seal ring out of its metal housing.

Another object of my invention is to provide a novel seal seat construction in which packings or O-rings are provided in the seal seat, so that the internal pressure within the valve will create forces which hold the plastic seal in its metal housing. These packings or O-rings act like a ring on a piston in an engine, tending to press the seal seat into its housing.

Still another object is to provide a seal seat construction so designed that trapped air behind the seal seat will be eliminated during assembly.

Other objects, advantages and features of invention may appear from the accompanying drawing, the subjoined detailed description and the appended claims.

Figure 1:
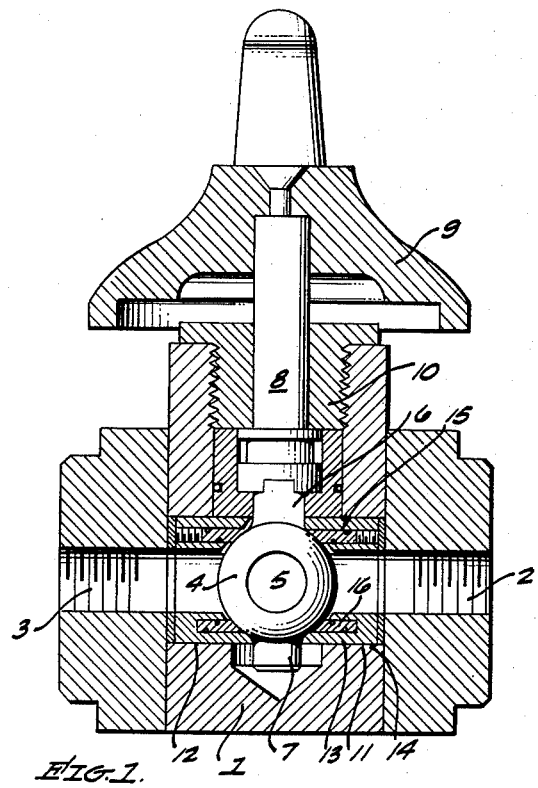
FIGURE 1 is a vertical sectional view of a ball valve embodying my seal seat construction.
Figure 3:
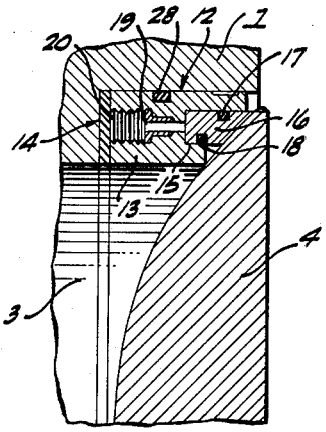
FIGURE 3 is an enlarged fragmentary horizontal sectional view of my seal seat construction.

Referring more particularly to the drawing, the numeral 1 indicates the body of a ball valve, and this body includes an intake port 2 and an outlet port 3. The usual pipe line in which a valve is mounted is attached to the ports 2 and 3 in a usual well known manner. A ball 4 is rotatably mounted in the body 1, and this ball includes a fluid passage 5 which may be rotated into or out of alignment with the ports 2—3, all of which is usual and well known in a valve of this type. A hub or journal 6 is formed on the upper end of the ball 4, and a similar hub or journal 7 is formed on the lower end of the ball. These hubs are in vertical alignment and are arranged and mounted substantially as shown. A control stem 8 engages the upper hub 6 for the purpose of rotating the ball 4. The stem 8 is rotated by a handle 9 attached to the upper end thereof. The stem 8 also extends through a suitable packing gland 10, all of which is usual and well known in the art. The ball 4 is engaged on the inlet side 2 by a seal seat assembly 11, and on the outlet side by a seal seat assembly 12. The seal seat assembly 11 and 12 are substantially identical in construction and, therefore, only one will be described in detail. A metal housing 13 fits within a properly shaped recess 14 in the body 1. The metal housing 13 is formed with an annular groove 15 in the inner face thereof, and this groove receives an annular seal seat 16. The housing 13 is formed of a suitable metal, while the seal seat 16 is preferably formed of a plastic such as "Teflon" (polytetrafluoroethylene), or a similar or analogous plastic.

Since valves are frequently subjected to quite high internal pressures, the fluid pressures therein will tend to get back of the seal seat, such as 16, and force that seat or extrude out of its internal housing. To prevent this I provide the following structure:

An outer O-ring 17 is seated in the seal seat 16 and engages the outer wall of the groove 15. A second O-ring 18 is also mounted in the seal seat 16 but on the innermost wall thereof, so that this O-ring engages the innermost wall of the groove 15. The O-rings 17—18 act like piston rings in the piston of an internal combustion engine, and any pressure within the valve will be exerted against the small exposed surface of the O-rings 17—18, thus exerting a force on the seal seat 16, tending to push the seal seat towards the bottom of the groove 15, and will thus tend to hold the seal seat in its housing 13.

To prevent air from becoming trapped in the bottom of the annular groove 15 when the seal seat 16 is assembled therein, I provide an air relief structure consisting of one or more holes 19 which are drilled in the housing 13 towards the edge of the housing opposite the groove 15, and these holes thus will vent any compressed air which might be formed within the groove 15 as the seal seat 16 is assembled in the groove. After the seal seat 16 is assembled, and assumes its final or operative position, the holes 19 may be plugged by a threaded plug 20, or by a plug which is welded in place, or a similar closure structure.

Figure 4:
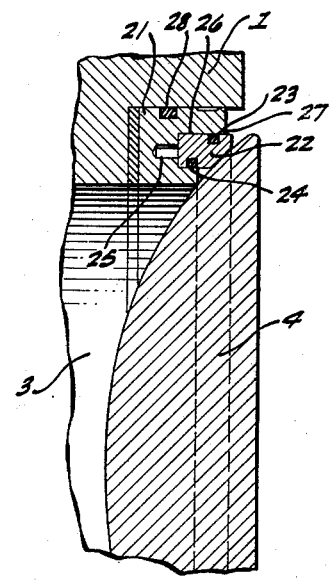
FIGURE 4 is a fragmentary horizontal sectional view of a modified form of seal seat construction.
Figure 2:
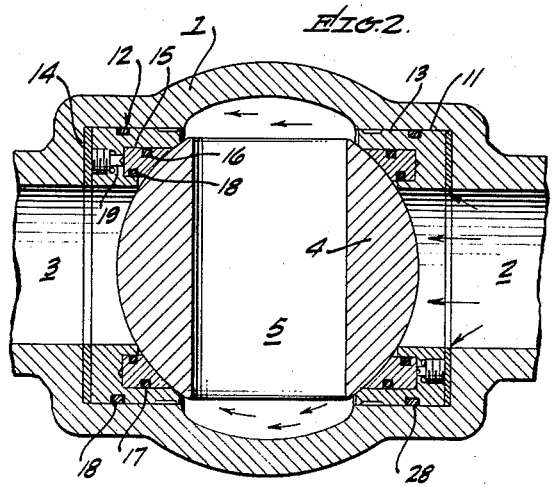
FIGURE 2 is a fragmentary horizontal sectional view of the same.

In the modification shown in FIGURE 4 the structure of the housing 21 is similar to the housing 13; also the seal seat 22 is similar in construction to the seal seat 16. Also the O-rings 23 and 24 are similar to the O-rings 17—18, previously described, and perform the same function. The modification shown in FIGURE 4 relates to the means of preventing air pressure from accumulating back of the seal seat 22 as that seal seat is assembled. In this instance a plurality of horizontal recesses 25 are drilled in the metal housing 21, and these recesses extend into the groove 26 which receives the seat 22. Due to the enlarged area created by the additional drilled recesses 25 the entrapped air does not increase in pressure to a substantial amount, or at least not sufficient to push or extrude the seat 22 out of the housing 21. If desired the housings 21 or 13 may each be provided with a lip 27, which is rolled over one edge of the seat 16 or 22 to assist in holding this seat in its housing, and also will assist in preventing the seat from being pushed out of the housing under pressure.

If desired, the metal housings 13 or 21 may be provided with an O-ring 28, which O-ring engages a wall of the recesses 11 or 12 to pack-off between the body 1 and the housing 13 or 21, to prevent leakage around the outside of the metal housing.

Having described my invention, I claim:

1. A valve comprising a body, said body having an intake and an outlet port therein, a ball rotatably mounted in said body between said intake and outlet ports, a seal seat assembly in said body engageable with the ball, said seal seat assembly comprising a metal housing, said metal housing having a groove formed therein, a sealing ring in said groove, one face of the sealing ring engaging the ball, and packing means positioned between the sealing ring and said metal housing, said packing means being within said groove in the housing, said housing having a pressure relief vent hole therein to relieve air pressure on assembly of the sealing ring in the housing, and a plug in said vent hole to close the same.

2. A valve comprising a body, said body having an intake and an outlet port therein, a ball rotatably mounted in said body between said intake and outlet ports, a seal seat assembly in said body engageable with the ball, said seal seat assembly comprising a metal housing, said metal housing having a groove formed therein, a nonmetallic sealing ring positioned in said groove, one face of the sealing ring engaging the ball, packing means mounted on the sealing ring on both of the outer and inner faces thereof, said packing means engaging the adjacent wall of said groove to span the space between the sealing ring and the adjacent wall of the housing, said housing having a pressure relief vent hole therein to relieve air pressure on assembly of the sealing ring in the housing, and a plug in said vent hole to close the same.

References Cited in the file of this patent
UNITED STATES PATENTS

| | | |
|---|---|---|
| 2,664,267 | Ray | Dec. 29, 1953 |
| 2,839,074 | Kaiser | June 17, 1958 |
| 2,950,897 | Bryant | Aug. 30, 1960 |
| 2,963,260 | Siravo | Dec. 6, 1960 |
| 2,963,262 | Shafer | Dec. 6, 1960 |